US00RE44475E

(19) United States
(12) Reissued Patent
Zakarian et al.

(10) Patent Number: US RE44,475 E
(45) Date of Reissued Patent: Sep. 3, 2013

(54) LUBRICATING COMPOSITION CONTAINING NON-ACIDIC PHOSPHORUS COMPOUNDS

(75) Inventors: John A. Zakarian, Hercules, CA (US); Michael J. Haire, Petaluma, CA (US)

(73) Assignee: Chevron U.S.A. Inc., San Ramon, CA (US)

(21) Appl. No.: 13/385,783

(22) Filed: Feb. 24, 2012

Related U.S. Patent Documents

Reissue of:
(64) Patent No.: 7,919,440
Issued: Apr. 5, 2011
Appl. No.: 11/122,461
Filed: May 4, 2005

(51) Int. Cl.

| | |
|---|---|
| ***C10M 141/10*** | (2006.01) |
| ***C10M 173/02*** | (2006.01) |
| ***C10M 135/04*** | (2006.01) |
| ***C10M 137/04*** | (2006.01) |
| ***C10M 135/22*** | (2006.01) |

(52) U.S. Cl.
USPC ..... 508/159; 508/156; 508/433; 508/441; 508/442; 508/569

(58) Field of Classification Search
USPC ..... 508/159, 156, 569, 441, 442, 433
See application file for complete search history.

(56) References Cited

U.S. PATENT DOCUMENTS

| | | | | | |
|---|---|---|---|---|---|
| 3,313,727 | A * | 4/1967 | Peeler | 508/156 |
| 3,819,521 | A * | 6/1974 | Sims | 508/160 |
| 3,853,772 | A * | 12/1974 | Adams | 508/156 |
| 3,907,601 | A * | 9/1975 | Schaefer | 29/623.1 |
| 3,997,454 | A * | 12/1976 | Adams | 508/156 |
| 4,089,790 | A * | 5/1978 | Adams | 508/156 |
| 4,472,288 | A * | 9/1984 | Frost, Jr. | 508/159 |
| 4,575,431 | A * | 3/1986 | Salentine | 508/159 |
| 4,717,490 | A * | 1/1988 | Salentine | 508/159 |
| 5,767,044 | A * | 6/1998 | Bigelow et al. | 508/186 |
| 5,922,657 | A * | 7/1999 | Camenzind et al. | 508/430 |
| 6,489,271 | B1 * | 12/2002 | Richardson | 508/186 |
| 6,489,721 | B1 * | 12/2002 | Haitko et al. | 313/565 |
| 6,534,450 | B1 * | 3/2003 | Harrison et al. | 508/158 |
| 6,573,223 | B1 * | 6/2003 | Vinci | 508/192 |
| 6,642,187 | B1 * | 11/2003 | Schwind et al. | 508/186 |
| 6,689,723 | B2 * | 2/2004 | Sullivan et al. | 508/185 |
| 2004/0214729 | A1 * | 10/2004 | Buitrago | 508/272 |

* cited by examiner

*Primary Examiner* — Ellen McAvoy
*Assistant Examiner* — Vishal Vasisth
(74) *Attorney, Agent, or Firm* — Penny Prater

(57) ABSTRACT

A lubricating composition with improved storage stability comprising a major amount of an oil of lubricating viscosity, at least one alkali metal borate, at least one polysulfide mixture having at least 40% dihydrocarbyl tetrasulfide or higher sulfides, and at least one non-acidic phosphorus compound comprised of a trihydrocarbyl phosphate and a dihydrocarbyl dithiophosphate derivative is disclosed. In addition to improved storage stability, the composition has improved wear performance when the ratio of polysulfides is controlled.

8 Claims, No Drawings

LUBRICATING COMPOSITION CONTAINING NON-ACIDIC PHOSPHORUS COMPOUNDS

Matter enclosed in heavy brackets [ ] appears in the original patent but forms no part of this reissue specification; matter printed in italics indicates the additions made by reissue.

*This application is a REI of Ser. No. 11/122,461, filed May 4, 2005, now U.S. Pat. No. 7,919,440.*

FIELD OF THE INVENTION

The present invention relates to lubricants generally and, more specifically, to lubricants for automotive and industrial gears.

BACKGROUND OF THE INVENTION

The use of dispersed alkali metal borates in lubricant formulations is well known. The patent literature has taught the combination of an alkali metal borate with sulfur compounds and particular phosphorus compounds. See for example, U.S. Pat. Nos. 4,717,490; 4,472,288; and patents cited therein. However, these prior art formulations suffer from shortened shelf life compared to other commercially available lubricants which do not use solid dispersions of borate. The phosphorus chemistry taught in the prior art relies on acidic compounds, which were needed for improvements in load-carrying ability and protection against seal leaks in the presence of water.

U.S. Pat. No. 4,717,490 to Salentine discloses a lubricating composition that is a combination of alkali metal borates, sulfur compounds, dialkyl hydrogen phosphite, and a mixture of >50% neutralized acidic phosphates. However, this composition suffers from a shortened shelf life compared to other commercially available lubricants, which do not use solid dispersions of alkali metal borates. In particular, this composition will exhibit additive "dropout" over time. The problem becomes more severe as the storage temperature increases. The standard remedy in the industry is to add more dispersant or detergent additives to the composition to improve the shelf life. However, these additives can negatively impact other performance properties of the gear lubricant. It is, therefore, an object of the present invention to provide an alkali metal borate-containing lubricant which has superior load carrying properties and improved storage stability.

Without being bound by a specific theory, we have discovered a major cause of the shortened shelf life for borate-containing formulations. The acidic phosphorus compounds, those with a hydrogen attached directly to a phosphorus or attached to a heteroatom which is in turn attached to a phosphorus, which were previously relied on for other performance benefits, appear to react with either the borate particles or with the basic dispersant and detergent additives that are used to stabilize the borate particles and to form a precipitate which settles to the bottom of the lubricant container. Although U.S. Pat. No. 4,717,490 to Salentine refers to the use of neutralized phosphates, the phosphates are only partially neutralized. In addition, U.S. Pat. No. 4,717,490 specifies use of a dihydrocarbyl phosphate, which contains an acidic hydrogen. We have found that using only non-acidic phosphorus compounds will result in much better shelf life without sacrificing either the load-carrying or seal-leak protection properties of the gear lubricant. In addition, load-carrying ability can be improved by selection of appropriate ratios of polysulfides.

SUMMARY OF THE INVENTION

The present invention provides a lubricating composition comprising an oil of lubricating viscosity having dispersed therein a minor amount of a mixture of: (a) a hydrated alkali metal borate component; (b) a dihydrocarbyl polysulfide component comprising a mixture including no more than 70 wt. % dihydrocarbyl trisulfide, more than 5.5 wt. % dihydrocarbyl disulfide, and at least 30 wt. % dihydrocarbyl tetrasulfide or higher polysulfides; and (c) a non-acidic phosphorus component comprising a trihydrocarbyl phosphite component, at least 90 wt. % of which has the formula $(RO)_3P$, where R is alkyl of 4 to 24 carbon atoms and at least one dihydrocarbyl dithiophosphate derivative.

DETAILED DESCRIPTION OF THE PREFERRED EMBODIMENTS

The present invention is a lubricating oil containing a combination comprising three components, which are (1) alkali metal borates; (2) at least one polysulfide having specific proportions of sulfides; and (3) non-acidic phosphorus compounds, including a dihydrocarbyl dithiophosphate derivative and a trialkyl phosphite. This base mix can be combined with foam inhibitors, metal deactivators, and optional detergents, dispersants, and oxidation inhibitors to form a complete lubricant formulation. A preferred embodiment of the present invention includes the combination of: (1) sodium triborate; (2) tertiary butyl polysulfide; and, (3) trilauryl phosphite and dialkyl dithiophosphate ester.

The Alkali-Metal Borates

The first component of a lubricating oil composition of the invention is a hydrated particulate alkali metal borate. The hydrated particulate alkali metal borates are well known in the art and are available commercially. Representative patents disclosing suitable borates and methods of manufacture include: U.S. Pat. Nos. 3,313,727; 3,819,521; 3,853,772; 3,907,601; 3,997,454; 4,089,790; and 6,534,450.

The hydrated alkali metal borates can be represented by the following formula:

$$M_2O.mB_2O_3.nH_2O$$

where M is an alkali metal of atomic number in the range 11 to 19, i.e., sodium and potassium; m is a number from 2.5 to 4.5 (both whole and fractional); and n is a number from 1.0 to 4.8. Preferred are the hydrated sodium borates, particularly the hydrated sodium triborate microparticles having a sodium-to-boron ratio of about 1:2.75 to 1:3.25. The hydrated borate particles generally have a mean particle size of less than 1 micron.

Organic Polysulfide

The dihydrocarbyl polysulfide is a mixture including no more than 70 wt. % and preferably no more than 60 wt. % dihydrocarbyl trisulfide, more than 5.5 wt. % dihydrocarbyl disulfide, and at least 30 wt. % and preferably at least 40 wt. % dihydrocarbyl tetrasulfide or higher polysulfides. Preferably, the dihydrocarbyl polysulfide mixture contains predominantly dihydrocarbyl tetrasulfide and higher polysulfides. The term "polysulfide" as used herein may also include minor amounts of dihydrocarbyl monosulfides, also referred to as monosulfide or sulfide. Generally, the monosulfide is present in relatively small amounts of less than about 1 wt. % of the total sulfur-containing compounds present. Typically, monosulfides may be present in amounts ranging from about 0.3 wt. % to about 0.4 wt. %. The monosulfides are preferably less than about 0.4 wt. % and more preferably less than about 0.3 wt. %.

The term "hydrocarbyl" includes hydrocarbon, as well as substantially hydrocarbon groups. "Substantially hydrocarbon" describes groups which contain heteroatom substituents that do not substantially alter the predominantly hydrocarbon nature of the substituent. Non-limiting examples of hydrocarbyl groups include the following: (1) hydrocarbon substituents, i.e., aliphatic (e.g., alkyl or alkenyl) and alicyclic (e.g., cycloalkyl, cycloalkenyl, etc.) substituents, aromatic-, aliphatic-, and alicyclic-substituted aromatic substituents and also includes cyclic substituents wherein the ring is completed through another portion of the molecule (that is, for example, any two indicated substituents may together form an alicyclic radical); (2) substituted hydrocarbon substituents, i.e., those substituents containing non-hydrocarbon groups which do not substantially alter the predominantly hydrocarbon nature of the substituent and which includes groups such as, e.g., halo (especially chloro and fluoro), hydroxy, mercapto, nitro, nitroso, and sulfoxy; (3) heteroatom substituents, i.e., substituents which will contain an atom other than carbon in a ring or chain otherwise composed of carbon atoms (e.g., alkoxy or alkylthio). Suitable heteroatoms include, for example, sulfur, oxygen, nitrogen, and such substituents containing one or more heteroatoms exemplified by pyridyl, furyl, thienyl, and imidazolyl.

In general, no more than about 2, preferably no more than 1, heteroatom substituent will be present for every 10 carbon atoms in the hydrocarbyl group. Typically, there will be no heteroatom substituents in the hydrocarbyl group in which case the hydrocarbyl group is a hydrocarbon. A preferred hydrocarbyl group is tertiary butyl.

The organic polysulfides may be prepared as described in U.S. Pat. Nos. 6,489,721; 6,642,187; and 6,689,723, which are incorporated by reference herein.

Phosphorus Compounds

A composition according to the present invention is non-acidic as defined herein and comprises two phosphorus compounds, a trihydrocarbyl phosphite and a phosphoric acid derivative.

Acidic phosphorus compounds as used herein mean compounds that contain a hydrogen atom bonded directly to a phosphorus atom or a hydrogen atom bonded to a hetero atom which is in turn bonded to a phosphorus atom. Non-acidic phosphorus compounds as used herein means that the trihydrocarbyl phosphite or the dithiophosphate derivative may contain an acid group, such as a carboxylic acid group, but do not contain a hydrogen atom bonded directly to phosphorus atom or a hydrogen atom bonded to a hetero atom which is in turn bonded to a phosphorus atom. Thus compounds having —P—H, —P—O—H and —P—S—H would be considered to be acidic, whereas the dithiophosphoric acid ester as described in U.S. Pat. No. 5,922,657 would be considered non-acidic as used herein even though it has a carboxylic acid functionality.

The phosphoric acid derivative may be based on a phosphorus compound as described in Salentine, U.S. Pat. No. 4,575,431, the disclosure of which is incorporated by reference herein. Preferably, the amino phosphorus compound is an amine dithiophosphate. Typical dithiophosphates useful in the lubricant of the present invention are well known in the art. These dithiophosphates are those containing two hydrocarbyl groups and one hydrogen functionality, and are therefore acidic and must be neutralized for use in the present composition. The hydrocarbyl groups useful herein are preferably aliphatic alkyl groups of 3 to 8 carbon atoms.

Representative dihydrocarbyl dithiophosphates include di-2-ethyl-1-hexyl hydrogen dithiophosphate, diisoctyl hydrogen dithiophosphate, dipropyl hydrogen dithiophosphate, and di-4-methyl-2-pentyl hydrogen dithiophosphate.

Preferred dithiophosphates are dihexyl hydrogen dithiophosphate, dibutyl hydrogen dithiophosphate, and di-n-hexyl hydrogen dithiophosphate.

For use in the present invention, acidic phosphates are completely neutralized by reaction with alkylamines. Neutralization must be at least 80% complete. For best results, neutralization should be in the range of 85% to 100%, wherein 100% neutralization refers to the reaction of one alkylamine with each acid hydrogen atom.

The amine moiety is typically derived from an alkylamine. The amine alkyl group is from 10 to 30 carbon atoms, preferably 12 to 18 carbon atoms in length. Typical amines include pentadecylamine, octadecylamine, cetylamine, and the like. Most preferred is oleylamine. When using a mixture of dithiophosphates and sulfur-free phosphates, the mole ratio of the dithiophosphates to the sulfur-free phosphates should be in the range of 70:30 to 30:70, preferably 55:45 to 45:55, and most preferably 1:1. The mole ratio of the substituted dihydrogen phosphates to the disubstituted hydrogen phosphates should be in the range 30:70 to 55:45, preferably 35:65 to 50:50, and most preferably 45:55.

The preferred phosphoric acid derivative is a dithiophosphoric acid ester as described in Camenzind, et al., U.S. Pat. No. 5,992,657. Preferably the dihydrocarbyl ester groups are alkyl as exemplified by Irgalube 353 from Ciba Specialty Chemicals.

The phosphorus component of the present invention also includes a trihydrocarbyl phosphite, which is non-acidic. Trihydrocarbyl phosphites useful in the present invention include $(RO)_3P$ where R is a hydrocarbyl of about 4 to 24 carbon atoms, more preferably about 8 to 18 carbon atoms, and most preferably about 10 to 14 carbon atoms. The hydrocarbyl may be saturated or unsaturated. Preferably, the trialkyl phosphite contains at least 90 wt. % of the structure $(RO)_3P$ wherein R is as defined above. Representative trialkyl phosphites include, but are not limited to, tributyl phosphite, trihexyl phosphite, trioctyl phosphite, tridecyl phosphite, trilauryl phosphite and trioleyl phosphite. A particularly preferred trialkyl phosphite is trilauryl phosphite, such as commercially available Duraphos TLP by Rhodia Incorporated Phosphorus and Performance Derivatives or Doverphos 53 by Dover Chemical Corporation. Such trialkyl phosphites may contain small amounts of dialkyl phosphites as impurities, in some cases as much as 5 wt. %. Preferred are mixtures of phosphites containing hydrocarbyl groups having about 10 to 20 carbon atoms. These mixtures are usually derived from animal or natural vegetable sources. Representative hydrocarbyl mixtures are commonly known as coco, tallow, tall oil, and soya.

The Lubricating Oil Composition

The borate, polysulfide and phosphorus components are generally added to a base oil that is sufficient to lubricate gears and other components which are present in automotive axles and transmissions, and in stationary industrial gear drives. Typically, the lubricating oil composition of the present invention comprises a major amount of oil of lubricating viscosity and a minor amount of the gear oil additive package.

The base oil employed may be any of a wide variety of oils of lubricating viscosity. The base oil of lubricating viscosity used in such compositions may be mineral oils or synthetic oils. A base oil having a viscosity of at least 2.5 cSt at 40° C. and a pour point below 20° C., preferably at or below 0° C., is desirable. The base oils may be derived from synthetic or natural sources. Mineral oils for use as the base oil in this invention include, for example, paraffinic, naphthenic and other oils that are ordinarily used in lubricating oil compositions. Synthetic oils include, for example, both hydrocarbon synthetic oils and synthetic esters and mixtures thereof having the desired viscosity. Hydrocarbon synthetic oils may include, for example, oils prepared from the polymerization of ethylene, polyalphaolefin or PAO oils, or oils prepared from hydrocarbon synthesis procedures using carbon monoxide and hydrogen gases such as in a Fisher-Tropsch process. Useful synthetic hydrocarbon oils include liquid polymers of alpha olefins having the proper viscosity. Especially useful are the hydrogenated liquid oligomers of $C_6$ to $C_{12}$ alpha olefins such as 1-decene trimer. Likewise, alkyl benzenes of proper viscosity, such as didodecyl benzene, can be used. Useful synthetic esters include the esters of monocarboxylic acids and polycarboxylic acids, as well as monohydroxy alkanols and polyols. Typical examples are didodecyl adipate, pentaerythritol tetracaproate, di-2-ethylhexyl adipate, dilaurylsebacate, and the like. Complex esters prepared from mixtures of mono and dicarboxylic acids and mono and dihydroxy alkanols can also be used. Blends of mineral oils with synthetic oils are also useful.

Thus, the base oil can be a refined paraffin type base oil, a refined naphthenic base oil, or a synthetic hydrocarbon or non-hydrocarbon oil of lubricating viscosity. The base oil can also be a mixture of mineral and synthetic oils. Additionally, other additives well known in lubricating oil compositions may be added to the additive composition of the present invention to complete a finished oil.

The alkali-metal borate will generally comprise 0.1 to 20.0 wt. % of the lubricant composition, preferably 0.5 to 15.0 wt. %, and more preferably 1.0 to 9.0 wt. %. The polysulfide compounds will comprise 0.1 to 10.0 wt. % of the lubricant composition, preferably 0.2 to 4.0 wt. %, and more preferably 0.5 to 3.0 wt. %. The trihydrocarbyl phosphite will comprise 0.01 to 10.0 wt. % of the lubricant composition, preferably 0.05 to 5.0 wt. %, and more preferably 0.10 to 1.0 wt. %. The other non-acidic phosphates will comprise 0.03 to 3.0 wt. % of the lubricant composition, preferably 0.07 to 1.5 wt. %, and more preferably 0.15 to 0.9 wt. %.

The lubricating composition described above can be made by addition of a concentrate to a lubricating base oil. Generally, the lubricant will contain 1.0 to 10.0 wt. % of the concentrate and preferably 2.0 to 7.5 wt. % of the concentrate.

Other Additives

A variety of other additives can be present in lubricating oils of the present invention. These additives include antioxidants, viscosity index improvers, dispersants, rust inhibitors, foam inhibitors, corrosion inhibitors, other antiwear agents, demulsifiers, friction modifiers, pour point depressants and a variety of other well-known additives. Preferred dispersants include the well known succinimide and ethoxylated alkylphenols and alcohols. Particularly preferred additional additives are the oil-soluble succinimides and oil-soluble alkali or alkaline earth metal sulfonates.

EXAMPLES

The following Examples are illustrative of the present invention, but are not intended to limit the invention in any way beyond what is contained in the claims which follow.

Example 1

Automotive Gear Oil Formulated with Trihydrocarbyl Phosphite

The additive concentrate package shown in Table 1 may be blended by any conventional method. An automotive gear lubricant of typical 80W-90 viscosity grade may be blended by any conventional method with at least one base stock as shown in Table 2 to achieve the desired viscosity range.

TABLE 1

Composition and Stability of Additive Packages (components in weight %)

| Components | Example 1 |
|---|---|
| Potassium triborate dispersion | 46.2 |
| Sulfurized isobutylene | 30.8 |
| Neutralized amine phosphate mixture | 6.9 |
| Dialkyl hydrogen phosphite | 0 |
| Trialkyl phosphite | 5.0 |
| Corrosion inhibitors | 3.9 |
| Succinimide dispersant | 1.6 |
| Calcium sulfonate detergent | 0.7 |
| Foam Inhibitor | 0.5 |
| Diluent oil | 4.5 |
| Total weight % | 100.00 |
| Storage Stability | |
| Time to heavy sediment @ 20° C. | >19 weeks |
| Time to heavy sediment @ 66° C. | 4 weeks |

TABLE 2

80W-90 Gear Lubricant Blend

| Component | Weight % |
|---|---|
| Mineral or Synthetic Base Stocks | 92.5 |
| Package in Table 1 | 6.5 |
| Pour Point Depressant | 1 |

Shelf life or storage stability of both additive concentrates and finished oil compositions can be evaluated by placing a sample in a 4 oz clear glass bottle and storing the sample at a specified temperature. The sample is observed at regular intervals to determine when sedimentation occurs.

TABLE 3

Additive Concentrate: Storage Stability

| | Additive Concentrate prepared with acidic di-hydrocarbyl phosphite | Additive Concentrate prepared with non-acidic tri-hydrocarbyl phosphite |
|---|---|---|
| Time to heavy sediment @ 150° F. | 1 week | 4 weeks |

TABLE 4

| Automotive Lubricant Composition: Storage Stablility | | |
|---|---|---|
| | SAE 80W-90 Gear Oil prepared with acidic di-hydrocarbyl phosphite | SAE 80W-90 Gear Oil prepared with non-acidic tri-hydrocarbyl phosphite |
| Time to heavy sediment @ 150° F. | 5 wk | 11+ wk |

The extreme pressure performance of the lubricant composition prepared as shown above was evaluated using the standard ASTM D2783 four ball EP test. The results in Table 5 show no decrease in extreme pressure performance when trihydrocarbyl phosphite was substituted for dihydrocarbyl phosphite in the lubricant composition. Both the load wear index and weld point remain constant.

TABLE 5

| Finished Oil 80W-90: Extreme Pressure Performance | | |
|---|---|---|
| Four Ball EP Test (D-2783) | SAE 80W-90 Gear Oil prepared with acidic di-hydrocarbyl phosphite | SAE 80W-90 Gear Oil prepared with non-acidic tri-hydrocarbyl phosphite |
| load wear index | 51.95 | 52.38 |
| weld point, kg | 200 | 200 |

Although used to prepare an automotive gear oil in the present example, the additive concentrate described in Table 1 may also by used to prepare industrial oils and greases as well.

Example 2

Industrial Oil Preparation

An analogous lubricating additive concentrate may be prepared as described in Example 1, Table 1, with the exception that the neutralized amine phosphate mixture is replaced by a phosphate ester and the sulfurized isobutylene is replaced by specific mixtures of polysulfides chosen according to the present invention to achieve desired ratios of di-, tri-, tetra- and higher polysulfides. Using mixtures of commercially available polysulfides (such as TBPS 344, TBPS 34, TBPS 454, and dialkyl disulfides available from ChevronPhillips Chemical Company), the ratios of polysulfides can be adjusted according to the present invention to achieve improved extreme pressure performance while maintaining improved storage stability. Lubricant additive concentrates obtained in this way were blended by conventional methods as shown in Table 7 to obtain representative industrial gear oils. While any ISO viscosity grade may be obtained by this method, ISO 220 oils were chosen to illustrate this example.

TABLE 6

| Additive Concentrate Package | | |
|---|---|---|
| Additive Function | Weight % | Chemical Type |
| Anti-Wear | 50 | Akali borate |
| Extreme Pressure Agent | 22 | Di-alky tetrasulfide |
| Extreme Pressure Agent | 2 | Di-alkyl disulfide |
| Anti-Wear | 8 | Tri-hydrocarbyl phosphate |
| Anti-Wear | 7 | Di-alkyl dithiophosphonate ester |
| Corrosion Inhibitor | 4 | Thiadiazole |
| Dispersant | 1 | Alkenyl succinimide |

TABLE 6-continued

| Additive Concentrate Package | | |
|---|---|---|
| Additive Function | Weight % | Chemical Type |
| Anti-Oxidant | 1 | Alkylaminotriazole |
| Detergent | 1 | Arylsulfonate |
| Anti Foam | 1 | Ethylacrylate copolymer |
| Diluent Oil | Balance to 100% | Mineral Oil |

TABLE 7

| Industrial Gear Lubricant Blend | |
|---|---|
| Component | Weight % |
| Mineral or Synthetic Base Stocks | 97 |
| Package in Table 1 | 2.75 |
| Demulsifier | 0.25 |

As shown in Table 8, industrial lubricant preparations continue to exhibit improved storage stability. It takes significantly longer time for sedimentation to occur in the finished oils when they are prepared with non-acidic tri-hydrocarbyl phosphite rather than acidic di-hydrocarbyl phosphite.

TABLE 8

| Industrial Lubricant Composition: Storage Stability | | |
|---|---|---|
| | ISO 220 Industrial Gear Oil prepared with acidic di-hydrocarbyl phosphite | ISO 220 Industrial Gear Oil prepared with non-acidic tri-hydrocarbyl phosphite |
| Time to first sediment @ 150° F. | 4 wk | 24+ wk |

In addition, the extreme pressure performance of oils formulated in this way can be improved by judiciously adjusting the polysulfide ratios. The extreme pressure wear performance was evaluated using the standard ASTM D2783 four ball EP test.

TABLE 9

| Extreme Pressure Performance of Industrial Oil Compositions ASTM D2783 | | | | | |
|---|---|---|---|---|---|
| | | Example 2A | Example 2B | Example 2C | Example 2D |
| | % S4+ | 47 | 19 | 12 | 6 |
| | % S3 | 46 | 81 | 86 | 91 |
| | % S2 | 7 | | 2 | 3 |
| Test | ASTM Test Code | | | | |
| Viscosity, cSt, 40° C. | D445 | 219.0 | 218.8 | 218.9 | 218.5 |
| Four Ball EP Test | D2783 | | | | |
| load wear index | | 59.82 | 55.74 | 55.71 | 54.76 |
| weld point, kg | | 315 | 250 | 250 | 250 |

Comparison of the ASTM D2783 results shows that superior extreme pressure results (Example 2A) can be obtained in accordance with the present invention with high ratios of tetra and higher sulfides when combined with a minimum amount of disulfide. In this fashion both the load wear index and weld point are improved.

There are numerous variations on the present invention which are possible in light of the teachings and supporting examples described herein. It is therefore understood that within the scope of the following claims, the invention may be practiced otherwise than as specifically described or exemplified herein.

What is claimed is:

1. A lubricating composition having enhanced load-carrying properties and enhanced storage stability comprising:

(a) at least 85% of a base oil of lubricating viscosity; and (b) no more than about 12% of an additive concentrate the concentrate consisting essentially of:

(i) from about 20 to about 60 wt % of hydrated alkali metal triborate dispersion;

(ii) from about 10 to about 50 wt % of a dihydrocarbyl polysulfide component;

(iii) from about 2 to about 12 wt % of a dihydrocarbyl dithiophosphate derivative; and (iv) from about 2 to about 12 wt % of a non-acidic phosphorus component.

2. The [process] *composition* of claim 1, wherein the dihydrocarbyl polysulfide component comprises a mixture including no more than 70 wt. % dihydrocarbyl trisulfide, more than 5.5 wt. % dihydrocarbyl disulfide, and at least 30 wt. % dihydrocarbyl tetrasulfide or higher polysulfides.

3. The [process] *composition* of claim 1, wherein the non-acid phosphorus component is further comprised of at least 90 wt. % of formula [$(RO)_3P$] $(RO)_{(3)}P$.

4. The [process] *composition* of claim 3, where R is an alkyl in the range of from 4 to 20 carbon atoms.

5. A lubricating oil concentrate which consists essentially of:

(a) from about 20 to about 60 wt % of hydrated alkali metal triborate dispersion;

(b) from about 10 to about 50 wt % of a dihydrocarbyl polysulfide component;

(c) from about 2 to about 12 wt % of a dihydrocarbyl dithiophosphate derivative; and (d) from about 2 to about 12 wt % of a non-acidic phosphorus component.

6. The concentrate of claim 5, wherein the dihydrocarbyl polysulfide component comprises a mixture including no more than 70 wt. % dihydrocarbyl trisulfide, more than 5.5 wt. % dihydrocarbyl disulfide, and at least 30 wt. % dihydrocarbyl tetrasulfide or higher polysulfides.

7. The [process] *concentrate* of claim 6, wherein the non-acid phosphorus component is further comprised of at least 90 wt. % of formula [$(RO)_3P$] $(RO)_{(3)}P$.

8. The [process] *concentrate* of claim 7, where R is an alkyl in the range of from 4 to 20 carbon atoms.

* * * * *